(12) United States Patent
Zhang et al.

(10) Patent No.: US 12,162,464 B2
(45) Date of Patent: Dec. 10, 2024

(54) REDUNDANT BRAKE AND BRAKE FAILOVER FOR AUTONOMOUS VEHICLES

(71) Applicant: PlusAI, Inc., Santa Clara, CA (US)

(72) Inventors: Yufeng Zhang, Santa Clara, CA (US); Siva Bhargav Ravella, San Jose, CA (US); Robert Joseph Dingli, Cupertino, CA (US); Amit Kumar, Sunnyvale, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/188,151

(22) Filed: Mar. 22, 2023

(65) Prior Publication Data

US 2024/0317197 A1   Sep. 26, 2024

(51) Int. Cl.
*B60T 8/88* (2006.01)

(52) U.S. Cl.
CPC ........... *B60T 8/885* (2013.01); *B60T 2260/02* (2013.01); *B60T 2270/402* (2013.01); *B60T 2270/413* (2013.01)

(58) Field of Classification Search
CPC ................. B60T 8/885; B60T 2260/02; B60T 2270/402; B60T 2270/413
See application file for complete search history.

(56) References Cited

U.S. PATENT DOCUMENTS

| | | | |
|---|---|---|---|
| 9,566,986 B1* | 2/2017 | Gordon | G05D 1/0061 |
| 11,046,330 B1* | 6/2021 | Katzourakis | B60W 10/04 |
| 2006/0017317 A1* | 1/2006 | Howell | B60T 13/36 303/9.66 |
| 2019/0079513 A1* | 3/2019 | Greenfield | B60W 50/023 |

* cited by examiner

*Primary Examiner* — Andrew J Cromer
(74) *Attorney, Agent, or Firm* — Kilpatrick Townsend & Stockton LLP

(57) ABSTRACT

Techniques are described for determining failover to a redundant braking system. An example method can include a system determining a fault occurring in a braking system of an autonomous vehicle (AV) operating in an autonomous mode, the braking system comprising a first braking system and a second braking system, the fault occurring in at least one of the first braking system and the second braking system, and the AV using the first braking system. The system can further determine whether to switch from using the first braking system based at least in part on determining the fault. The system can further transmit to an alert system of the AV, a request to generate an alert for manual control of the AV based at least in part on determining the fault. The system can further deactivate the autonomous mode of the AV based at least in part on determining the fault.

7 Claims, 6 Drawing Sheets

REDUNDANT BRAKE AND BRAKE FAILOVER FOR AUTONOMOUS VEHICLES

BACKGROUND

Various vehicles employ computing means to aid automated vehicle operation. Recently, in the automotive industry, much of the focus is on making a vehicle operate in an autonomous mode in a safe manner.

An autonomous vehicle (AV) in an autonomous mode can be configured to enable a brake to activate in response to sensing an internal or external stimuli. Some vehicles can include a redundant braking system that can activate an actuator for a secondary braking system in the event that an actuator for a primary braking system fails. However, this approach fails to provide a holistic strategy for braking system redundancy for an AV. This approach further fails to take into account the control capabilities of an AV.

Embodiments are directed to address these and other problems, individually and collectively.

BRIEF SUMMARY

Embodiments described herein are directed toward a method for a redundant brake failover for an autonomous vehicle. The method includes a computing system determining a fault occurring in a primary braking system of an autonomous vehicle operating in an autonomous mode, the primary braking system comprising a first braking system and a second braking system controlled by the computing system, the fault occurring in at least one of the first braking system and the second braking system. The computing system can further determine whether to switch from using the first braking system based on determining the fault. The computing system can further transmit to an alert system of the autonomous vehicle, a request to generate an alert for switching to manual control mode of the autonomous vehicle based on determining the fault. The computing system can further deactivate the autonomous mode of the autonomous vehicle upon determining that the autonomous vehicle is in the manual control mode.

Embodiments can further a computing system, including a processor and a computer-readable medium including instructions that, when executed by the processor, can cause the processor to perform operations, including determining a fault occurring in a primary braking system of an autonomous vehicle operating in an autonomous mode, the primary braking system comprising a first braking system and a second braking system controlled by a computing system, the braking system comprising a first braking system and a second braking system, the fault occurring in at least one of the first braking system and the second braking system, and the autonomous vehicle using the first braking system. The instructions that, when executed by the processor, can further cause the processor to perform operations, including determining whether to switch from using the first braking system based at least in part on determining the fault. The instructions that, when executed by the processor, can cause the processor to perform operations, including transmitting to an alert system of the autonomous vehicle, a request to generate an alert for switching to manual control mode of the autonomous vehicle based on determining the fault. The instructions that, when executed by the processor, can cause the processor to perform operations, including deactivating the autonomous mode of the autonomous vehicle upon determining that the autonomous vehicle is in the manual control mode.

Embodiments can further include a non-transitory computer-readable medium including stored thereon instructions that, when executed by a processor, causes the processor to perform operations including determining a fault occurring in a primary braking system of an autonomous vehicle operating in an autonomous mode, the braking system comprising a first braking system and a second braking system controlled by a computing system, the fault occurring in at least one of the first braking system and the second braking system, and the autonomous vehicle using the first braking system. The instructions that, when executed by the processor, can further cause the processor to perform operations, including determining whether to switch from using the first braking system based on determining the fault. The instructions that, when executed by the processor, can cause the processor to perform operations, including transmitting to an alert system of the autonomous vehicle, a request to generate an alert for switching to manual control mode of the autonomous vehicle based on determining the fault. The instructions that, when executed by the processor, can cause the processor to perform operations, including deactivating the autonomous mode of the autonomous vehicle upon determining that the autonomous vehicle is in the manual control mode.

Other embodiments of this aspect include corresponding computer systems, apparatus, and computer programs recorded on one or more computer storage devices, each configured to perform the actions of the methods.

Further details regarding embodiments can be found in the Detailed Description and the Figures.

DETAILED DESCRIPTION

Figure 1:
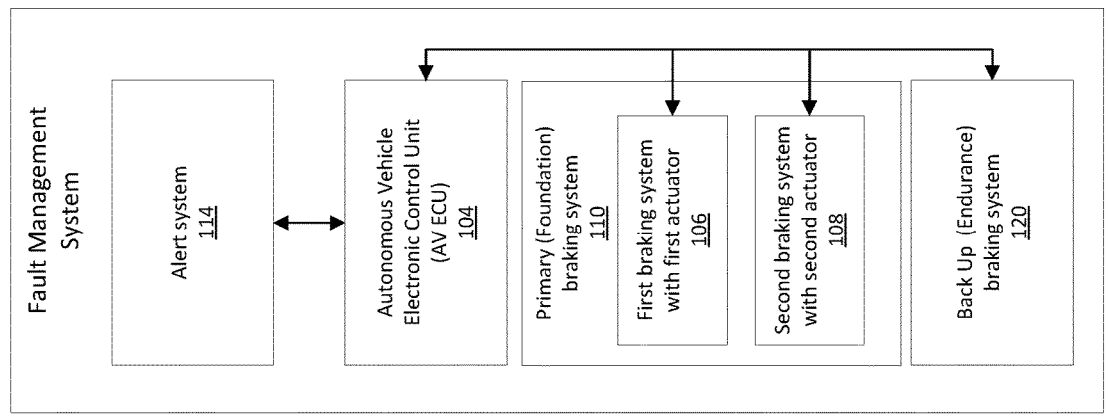
FIG. 1 is an illustration of an autonomous vehicle with a redundant braking system, according to one or more embodiments.
Figure 1:
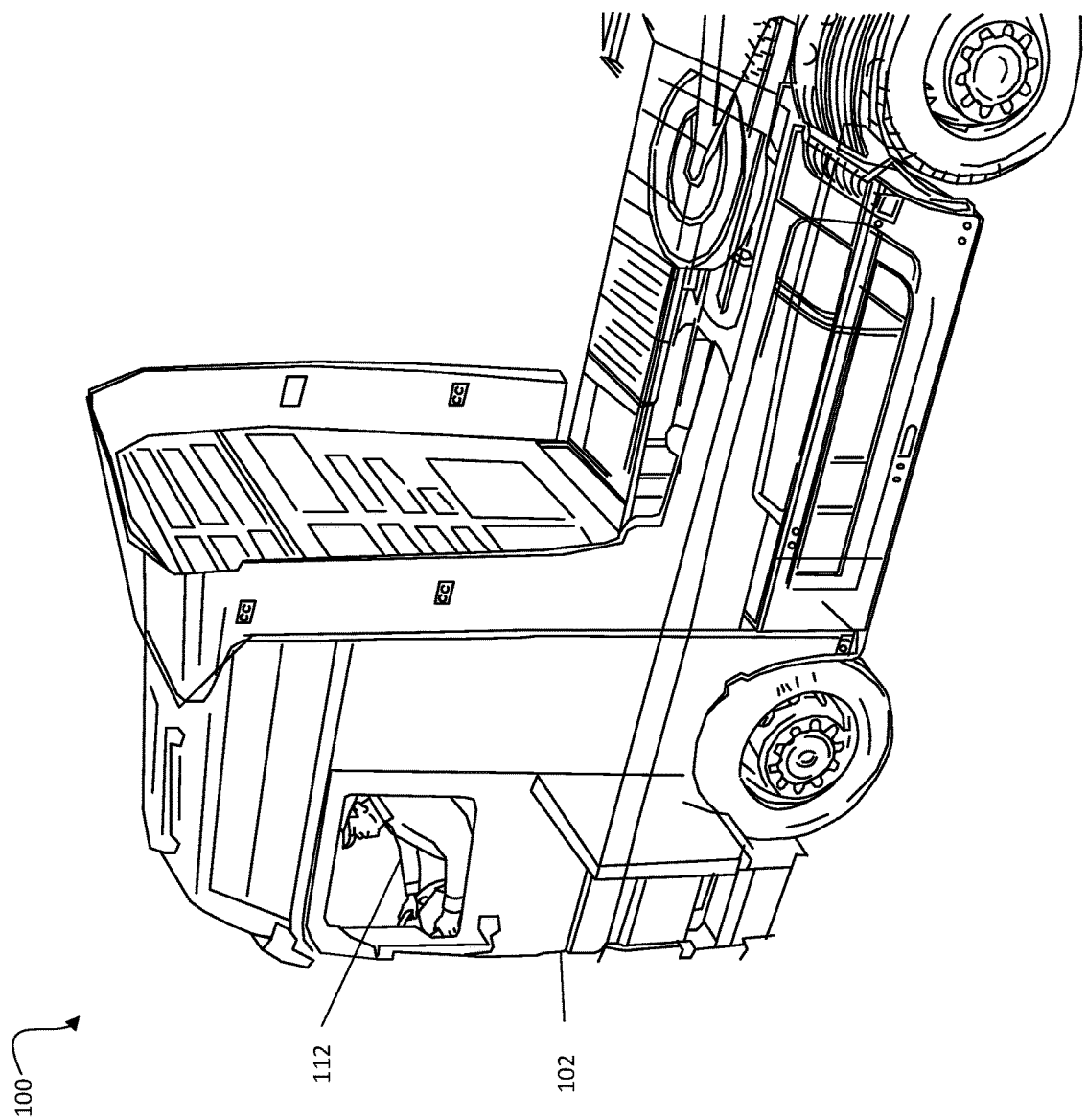

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

An autonomous vehicle (AV) can operate in an autonomous mode, in which the AV's computer system can control portions of a driving operation. Regardless of whether an AV driver is assisting with the operation of the vehicle or not assisting with the operation of the vehicle, a failure in the braking system can be disastrous. If the AV's computer system cannot properly and timely make an adjustment in response to determining a brake failure, a danger can be created for the driver and any other drivers or passengers in surrounding vehicles. One solution to mitigating a braking system failure is to incorporate a redundant braking system into the AV. The redundant braking system can provide the computer system with flexibility in the event that the primary braking system fails. For example, the computing system can switch to a redundant braking system in the event that the primary braking system fails.

Heavy duty trucks (e.g., class 8 trucks) can include endurance brakes, such as retarder or engine brakes. A retarder brake can include a device that can assist a braking system by converting the kinetic energy of a vehicle to heat energy without relying on friction-based mechanisms. An engine brake can include a device that uses an engine's compression to create drag on the engine's drivetrain. However, endurance brakes are not as reliable as foundation brakes (e.g., air brakes).

One issue that can arise is that an AV with a redundant braking system may not include an effective control system that can determine when the AV should engage the redundant braking system. For example, the AV's computer system may be ill-equipped to determine whether to engage the redundant braking system based on a severity of the brake failure (a single system failure or multiple system failures). Additionally, the AV's computer system may be ill-equipped to determine a time and a type of warning to provide the driver and or a remote control center based on a severity of the failure.

Conventional approaches with respect to redundant braking systems generally include improving the redundancy of the actuators or improving methods of detecting brake failures.

Embodiments described herein address the above-referenced issues by providing techniques that include a continuous monitoring of an AV's braking systems using a sensor-based feedback to handle various brake failure modes. The techniques can mitigate the effect of brake failure by using a fault management system that can respond based on a severity of a brake failure and issue an alert to a driver or a remote control center. An AV can include (1) a primary or foundation braking system comprising a first braking system that can be activated via a first actuator and a second braking system that can be actuated via a second actuator, and (2) a supplemental or endurance braking system. According to various embodiments, the primary braking system may be activated through two separate and distinct actuators. If either the first braking system or the second braking system fails while the AV is in an autonomous mode, the AV can failover to the functioning braking system. If both the first braking system and the second braking system fail, the AV can fail over to an endurance braking system and transmit a request for the driver to assume control of the AV. In each case, the AV can be responsive to the braking system failure, including a severity of the failure.

Prior to discussing embodiments, some terms can be described in further detail.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

FIG. 1 is an illustration 100 of an AV with a redundant braking system, according to one or more embodiments. The AV 102 can include an AV electronic control unit (ECU) 104, a primary (foundation) braking system 110 comprising a first braking system 106 that can be activated via a first actuator, a second braking system 108 that can be activated via a second actuator, a supplemental back-up (endurance) braking system 120, and an alert system 114. According to various embodiments, the endurance (e.g., back-up) braking system may use a different braking mechanism than the foundation (e.g., primary) braking system. For example, the foundation brake system may include air brake system(s) that apply resistance to the road wheels of the AV 102, and the endurance brake system may apply resistance to the rotation of the drive wheels of the AV 102.

The AV ECU 104 can include an embedded electronic system that controls one or more systems or subsystems, including the braking system of the AV 102. It should be appreciated that although only one AV ECU is illustrated, the AV ECU 104 can include many AV ECUs that control different AV systems (e.g., engine power, power seats, climate control, power steering, modes).

The AV ECU 104 can be in operable communication with the first braking system 106, the second braking system 108. The first braking system 106 and the second braking system 108 can each include a local controller for communicating with the AV ECU 104. The first braking system 106 and the second braking system 108 can further include a respective set of sensors for collecting braking data. The AV ECU 104 can receive sensor data from each braking system that is indicative of the performance of the braking system. The sensor-based data can include a wheel speed, a vehicle speed, a brake fluid level, and other appropriate sensor-based data. The AV ECU 104 can be operable to determine whether there is a performance-based fault occurring in either the first braking system 106 or the second braking system 108 based on the sensor data. The AV ECU 104 can further communicate with a controller of each braking system. For example, each braking system can include a local controller for sending and receiving data to and from the AV ECU 104. The AV ECU 104 can determine whether there is a fault occurring in the first braking system 106 or the second braking system 108 based on a communication, or a lack or lapse thereof with a respective controller of the braking systems. The AV ECU 104 can communicate with the first braking system 106 using a first transmission protocol and the second braking system 108 using a second transmission protocol. In some embodiments, the first braking system 106 and the second braking system 108 communicate to the AV ECU 104 via separate mediums. For example, the first braking system 106 can communicate with the AV ECU 104 using a first bus system and the second braking system 108 can communicate with the AVE ECU 104 using a bus system. In this sense, a failure in the communication between the AV ECU 104 and one of the braking systems, does not affect the communication with the other braking system.

The first braking system 106 and the second braking system 108 can assume various forms. For example, the first braking system 106 can include one or more braking pistons and hydraulic lines that operate on one or more axles of the AV 102, and the second braking system 108 can include one or more secondary braking pistons and hydraulic lines that operate on one or more axles of the AV 102. The hydraulic lines can enable the first braking system to be in fluidic communication with a first braking piston. A separate set of hydraulic lines can enable the second baking system to be in fluidic communication with a second braking piston. The AV ECU 104 can control the one or more primary brake pistons to move in response to hydraulic pressure in the primary brake piston chambers. The AV ECU 104 can further cause the secondary brake pistons to move in response to hydraulic pressure in secondary brake piston chambers. The back-up (endurance) braking system 120 can include mechanisms such as electromagnetic retarders, exhaust brakes, etc. that reduces the speed of the AV 102 without using the brake mechanisms (e.g., brake pads) coupled to the road wheels of the AV 102. In some instances, the primary (foundation) braking system 110 can include a second (redundant) actuator that can be used to operate the first braking system 106 through a separate route than the first (primary) actuator. The primary (foundation) braking system 110 may include a dual-actuator enabled foundation brake pressure hoses connected to the two actuators that are routed independently from the pressure reservoir to foundation brake discs coupled to the road wheels of the AV 102.

A fault occurring in the first braking system 106 or the second braking system 108 during a time in which the AV 102 is in an autonomous mode can cause the AV ECU 104 to failover a functioning braking system. The AV ECU 104 can further generate a request to issue an alert for a driver 112 to assume manual control mode. For example, if there is an indication of a fault in the first braking system 106, the AV ECU 104 can be configured to failover to the second braking system 108 to control the AV's braking. A fault can be the result of a mechanical failure (e.g., loss of air pressure in the braking system), a performance level of the braking system (e.g., deceleration after applying brakes is less than a threshold deceleration), or a loss of communication with a braking system. In the event that there is a fault occurring in both the first braking system 106 and the second braking system 108, the AV ECU 104 can failover to the endurance braking system 120. The endurance braking system 120 can include one or more sensors that can transmit data to the AV ECU 104. This enables the AV ECU 104 to determine if the endurance braking system has been engaged. The driver can further engage or disengage the endurance braking system 120. Upon detection of a fault occurring in the second braking system, the AV ECU 104 can continue using the first braking system 106.

Accordingly, upon detection of the fault occurring in either the first braking system 106 or the second braking system 108, the AV ECU 104 may generate an alert for switching to a manual control mode based at least in part on determining the fault. The alert system 114 can issue an alert (e.g., an audio signal, a visual signal, or a vibration signal) to alert the driver 112 that one or more braking systems have failed, and the driver should assume manual control of the AV 102. The AV ECU 104 can receive a signal that the driver has assumed control of the AV 102 and deactivate the autonomous mode of the AV 102. The AV ECU 104 may further deactivate the autonomous mode of the autonomous vehicle upon determining that the autonomous vehicle is in the manual control mode.

Figure 2:
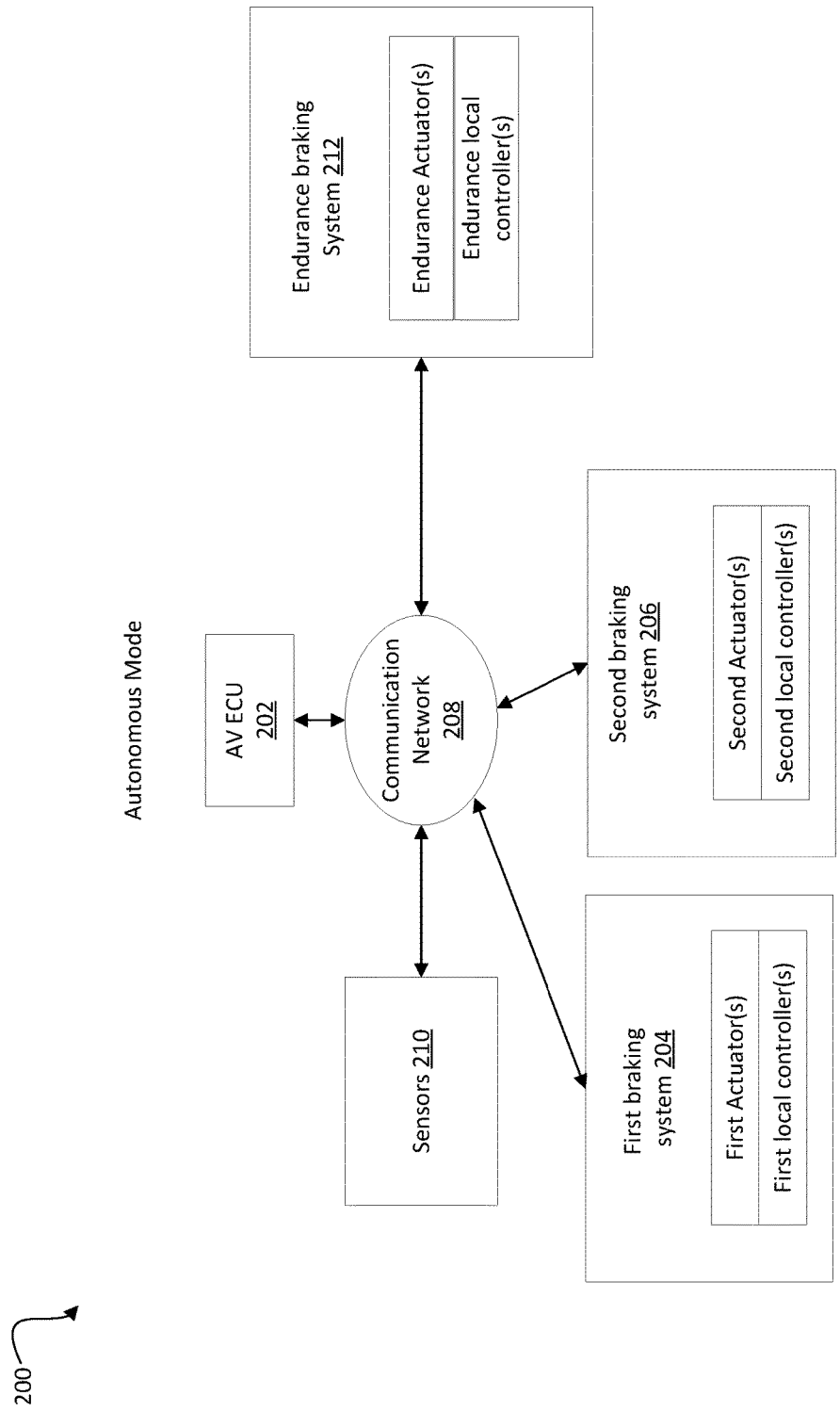
FIG. 2 is an illustration of a fault management system for an AV, according to one or more embodiments.

FIG. 2 is an illustration 200 of a fault management system for an AV, according to one or more embodiments. The fault management system includes autonomous mode aspects and manual control mode aspects. In the autonomous mode, the AV can include various levels of computer assistance to operate the AV. In the autonomous mode, an AV ECU 202 can control a first braking system 204 and a second braking system 206. Each of the first braking system 204 and the second braking system 206 can respectively include one or more local controllers for transmitting and receiving electronic signals with the AV ECU 202 via a communication network 208. Each of the first braking system 204 and the second braking system 206 can respectively further include one or more actuators for mechanically controlling the speed of the AV.

The AV ECU 202 can communicate with the first braking system 204 using a first communication protocol and communicate with the second braking system 206 using a second communication protocol. Each communication protocol can include a respective set of rules, syntax, and semantics for communication. Therefore, in order for the AV ECU 202 to switch between communicating with the first braking system 204 and the second braking system 206, the AV ECU 202 also switches communication protocols. In some instances, the AV ECU 202 can communicate with each of the first and second braking system using a different set of hardware, including transmitters, receivers, and wires. In this sense, if there is a fault occurring in the communication between the AV ECU 202 and one braking system, the fault does not carry over to the other braking system.

The AV ECU 202 can further be in operable communication with a set of sensors 210 arranged about the AV. The sensors 210 can include wheel speed sensors, a vehicle speed sensors, proximity sensors, braking system fluid sensors, and any other appropriate sensor. The sensors 210 can receive data from each of the first braking system 204 and the second braking system 206. The sensor data can include a respective identifier (e.g., first identifier and second identifier), which the AV ECU 202 can use to determine whether the sensor data relates to the first braking system 204 or the second braking system 206, or both braking systems. The AV ECU 202 can continuously receive data from the sensors to determine whether the braking systems are operating properly. For example, the sensor data can be compared to threshold values or baseline reading to determine whether each braking system is operating properly. As indicated above, the AV ECU 202 can transmit and receive data from a local controller of each braking system. Therefore, the AV ECU 202 can determine whether there is a fault occurring in either braking system based on the sensor data or based on communication, or the lack or lapse thereof, with either braking system.

The fault management system permits the AV ECU 202 to continuously receive data from the sensors 210 and communicate with the first braking system 204 and the second braking system 206. In the event that either the AV ECU 202 determines a fault occurring in either the first braking system 204 or the second braking system 206, the AV ECU 202 can operate the functioning braking system. For example, consider a situation in which the AV is in an autonomous mode and operating using the first braking system 204. If the AV ECU 202 determines a fault occurring in the first braking system 204 (e.g., based on sensor-based data or communication with the first braking system 204). The AV ECU 202 can switch from using a first communication protocol associated with the first braking system 204 to a second communication protocol associated with the second braking system 206. The AV ECU 202 can control the second braking system 206 using the second communication protocol.

In another example, if the AV ECU 202 is controlling the first braking system 204 and the AV ECU 202 determines that there is a fault occurring in the second braking system 206, the AV ECU 202 can continue to control the first braking system 204. In yet another example, the AV ECU 202 can be controlling the first braking system 204 and the AV ECU 202 can determine that there is a fault occurring in both the first braking system and the second braking system 206. In this situation, the AV ECU 202 cannot switch over to another electronically controlled braking system.

In each of the above three examples, the AV ECU 202 can determine a fault occurring in either the first braking system 204, the second braking system 206 or both braking systems. In each case, the AV ECU 202 can further contact an alert system to issue an alert to a driver 212 to assume control of the AV. According to various embodiments, in response to determining that the driver 212 assumed control of the AV (e.g., the AV is in manual control mode), the AV ECU 202 can deactivate the autonomous mode. As such, the AV only remains in an autonomous mode if both the first braking system 204 and the second braking system 206 are functioning.

A failure at the first braking system 204 or the second braking system 206 can be considered a level 1 failure. A failure at both the first braking system 204 and the second braking system is more severe than a level 1 failure, and therefore can be considered a level 2 failure. In the event that both the first braking system 204 and the second braking system fail, the AV ECU 202 can failover to the endurance braking system 214 and immediately have a steering system commence a minimal risk maneuver (e.g., pulling over to the side of the road, slowing down to a stop) to mitigate any danger.

Figure 3:
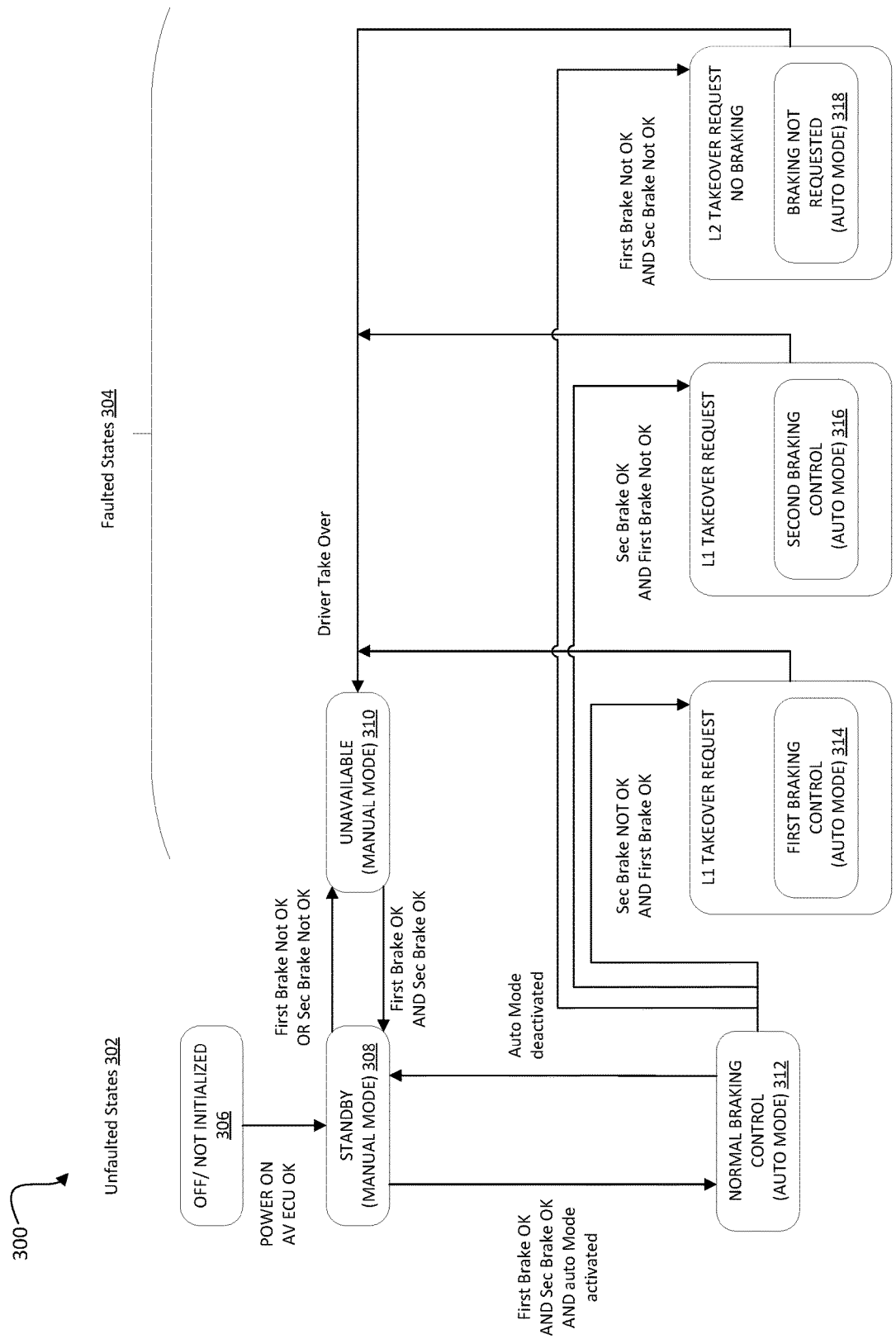
FIG. 3 is a state diagram for a fault management system, according to one or more embodiments.

FIG. 3 is a state diagram 300 for a fault management system, according to one or more embodiments. The first braking system and the second braking system can be in either unfaulted states 302 or faulted states 304. In an unfaulted state, an AV ECU can be either off or not initialized. The AV can be powered on and the AV ECU can be initialized, such that the autonomous mode is on standby 308 and the AV is in manual control mode. While the AV ECU is on standby, the AV can be in a manual control mode, such that the driver operates the AV without computer assistance.

The AV ECU can perform an initial check to determine whether there is a fault occurring in either the first braking system or the second braking system. If AV ECU determines a fault occurring in either the first braking system or the second braking system, the autonomous mode can be unavailable 310 and the AV can remain in manual control mode until such time that there is no fault occurring in either the first braking system or the second braking system.

If the AV ECU determines that there is no fault occurring in either the first braking system or the second braking system, the AV ECU can activate the autonomous mode of the AV. The AV ECU can further assume normal braking control 312 for the AV. In other words, the AV ECU can control the engagement or disengagement of the first braking system and the second braking system, if needed. In general, when the AV is in autonomous mode and the AV ECU can assume normal braking control 312, the AV is using the first braking system and the second braking system can be used in the event that there is a fault occurring in the first braking system. If the autonomous mode is deactivated, the autonomous mode can return to standby 308 and the AV can be in manual control mode.

The AV ECU can continuously receive data from one or more sensors coupled to the AV. The sensors can collect data associated with the first braking system and the second braking system The AV ECU can further continuously compare the sensor data to threshold data to determine whether each of the first braking system and the second braking system are operating properly. For example, the sensors can gather acceleration data and deceleration data to determine whether the brakes are slowing down at a threshold rate. If the brakes are causing the AV to decelerate at or greater than the threshold rate, the AV ECU can determine that the brakes are in an unfaulted state. If the brakes are causing the AV to decelerate at less than the threshold. The AV ECU can determine that the brakes are in a faulted state.

The AV ECU can further be in operable communication with a respective controller of the first braking system and the second braking system. The AV ECU can determine whether either of the first braking system or the second braking system is in a faulted state based on the communication. For example, if either the first braking system or the second braking system ceases to communicate with the AV ECU, the AV ECU can determine that there is a fault occurring in the braking system. In another example, if either the first braking system or the second braking system communicated using corrupted data or incomplete data, the AV ECU can determine that there is a fault occurring in the braking system.

In one instance, the AV ECU can determine that there is a fault occurring in the second braking system, but that there is no fault occurring in the first braking system. As the AV is using the first braking system and there is no determined fault occurring in the first braking system, the AV ECU does not switch over to the second braking system. Rather, the AV ECU remains in first braking control 314 and the AV remains in autonomous mode. The AV ECU can transmit a level 1 (L1) takeover request that a driver (if any) takeover control of the AV. The AV ECU can further monitor for a signal indicating that a driver has taken control of the AV. For example, the AV ECU can determine, such as based on a signal from a pressure sensor, that the driver has assumed control of the steering wheel. In response to determining that the driver has assumed control of the AV, the AV ECU can further deactivate the autonomous mode, such that the autonomous mode is unavailable 310 and the AV can enter a manual control mode. In some instances, the AV ECU can include a timer and wait for the expiration of the timer for a signal that a driver has assumed control of the AV and the AV is in a manual control mode. In the instance, that the AV ECU determines that the driver has assumed control of the AV prior to the expiration of the timer, the AV ECU can deactivate the autonomous mode. If the AV ECU determines that the driver has not assumed control of the AV upon expiration of the timer, the AV ECU can cause a steering system of the AV to make a minimal risk maneuver (e.g., stop moving, pull over to the side of the road). Upon execution of the minimal risk maneuver, the AV ECU can deactivate the autonomous mode.

In another instance, the AV ECU can determine a fault occurring in the first braking system and determine that there is no fault occurring in the second braking system. For example, the AV ECU can either receive sensor data that there is a fault occurring in the first braking system or a communication, or the lack or lapse thereof, from the first braking system that indicates there is a fault occurring in the first braking system. As the AV ECU initially controls the first braking system in the autonomous mode, the AV ECU can switch from a first braking control 314 to a second braking control 316. The first braking system and the second braking system can each use a respective communication protocol. Therefore, the AV ECU can switch from communicating with the first braking system using the first communication protocol to communicating with the second braking system using a second communication protocol. The second braking system can include a different set of actuators for controlling a wheel speed of the AV. The AV ECU can use the second communication protocol to control the set of actuators for the second braking system.

The AV ECU can further transmit a level 1 (L1) takeover request that a driver (if any) takeover control of the AV. The AV ECU can further monitor for a signal indicating that a driver has taken control of the AV. In response to determining that the driver has assumed control of the AV, the AV ECU can further deactivate the autonomous mode and the AV can enter a manual control mode. In some instances, the AV ECU can include a timer and wait for the expiration of the time for a signal that a river has assumed control of the AV. In the instance, that the AV ECU determines that the driver has assumed control of the AV prior to the expiration of the timer, the AV ECU can deactivate the autonomous mode. In the AV ECU does not determine that the driver has assumed control of the AV upon expiration of the timer, the AV ECU can cause a steering system of the AV to make a minimal risk maneuver. Upon execution of the minimal risk maneuver, the AV ECU can deactivate the autonomous mode.

In some instances, the AV ECU can determine that there is a fault occurring in both the first braking system and the second braking system. In this instance, the AV ECU cannot failover to either the second braking system or remain controlling the first braking system. This instance is more severe than determining a fault occurring in the first braking system or the second braking system. The AV ECU can failover to an endurance braking system that, along with a steering system of the AV, can be used to immediately perform a minimal risk maneuver to mitigate any potential danger. The AV ECU can further transmit a level 1 (L1) takeover request that a driver (if any) takeover control of the AV. The AV ECU can further monitor for an indication that a driver has taken control of the AV. In response to determining that the driver has assumed control of the AV, the AV ECU can further deactivate the autonomous mode and the AV can enter a manual control mode 310. In some instances, the AV ECU can include a timer and wait for the expiration of the timer for the indication that the driver has assumed control of the AV. In the instance that the AV ECU determines that the driver has assumed control of the AV prior to the expiration of the timer, the AV ECU can deactivate the autonomous mode.

Figure 4:
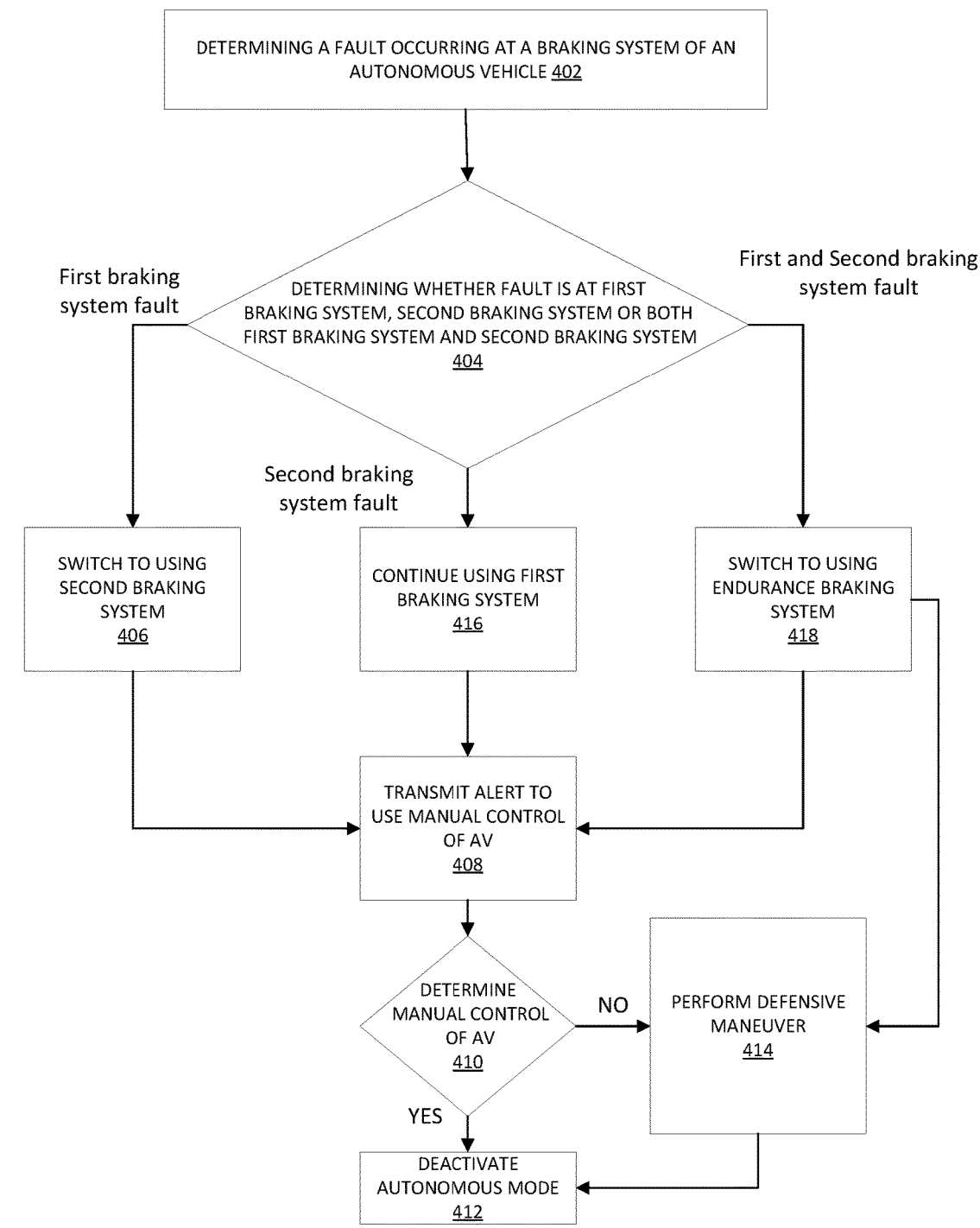
FIG. 4 is a flow chart for a fault management system, according to one or more embodiments.

FIG. 4 is a flow chart 400 for a fault management system, according to one or more embodiments. While some operations of processes 400 and 500 are described as being performed by generic computers, it should be understood that any suitable device may be used to perform one or more operations of these processes. Processes 400 and 500 are respectively illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 402, the process can include a computing system determining a fault occurring at a braking system of an AV. The computing system can include an AV ECU that can control a first braking system and a second braking system of the AV. The AV can be operated in a manual control mode by a driver or an autonomous mode, in which the driver can provide assistance to a computing system for operating the AV. The AV can include a set of sensors for monitoring the first braking system and a set of sensors for monitoring the second braking system. The sensors can provide the AV ECU data collected from the first braking system and the data collected from the second braking system regardless of whether AV is using the first braking system or the second braking system. Based on the received sensor data, or a lack or lapse of sensor data, AV ECU can determine that there is a fault occurring in at least one of the first braking system or the second braking system. The AV ECU can further be in communication with the first braking system and the second braking system regardless of whether the AV is using the first braking system or the second braking system. For example, the AV ECU can transmit control instructions to engage or disengage a brake. In another example, the AV ECU can transmit a request for a status update. In yet another example, the AV ECU can transmit control instructions to reconfigure a local controller of a braking system. Based on a communication, or a lack or lapse thereof, between the AV ECU and a braking system controller, the AV ECU can determine that there is a fault occurring in a braking system.

At 404, the computing system can determine whether the fault is at the first braking system the second braking system, or both the first braking system and the second braking system. For example, the data packets that are received from the sensors can include identifiers as to whether the sensor data relates to the first braking system or the second braking system. Additionally, communication from a braking system controller can include a respective identifier as to whether the communication is from the first braking system (e.g., first identifier) or from the second braking system (e.g., second identifier). The computing system can determine whether the fault is at the first braking system the second braking system, or both the first braking system and the second braking system based on the communication, or a lack or lapse thereof and the identifier. For example, if the computing system receives communication that includes a first identifier but does not receive communication that includes the second identifier, the computing system can determine that there is a fault occurring in the second braking system.

If the computing system determines that the fault is at the first braking system, the computing system can switch to controlling the second braking system at 406. The computing system can communicate with the first braking system using a first communication protocol and communicate with the second braking system using a second communication protocol. Therefore, the computing system can switch from the first communication protocol to the second communication protocol to communicate with the second braking system.

At 408, the computing system can transmit control instruction to issue an alert to the driver, if any, to assume manual control of the AV. The alert can be, for example, a visual or audio signal transmitted in a cabin of the AV. In other instances, the alert can be a visual or audio signal transmitted by the driver's user device (e.g., smart phone, tablet). In some instances, the computing system can further include a timer. The computing system can, based on transmitting instructions to issue the alert, start the timer and then wait for the expiration of a timer to determine whether the driver has assumed control of the AV.

If, prior to the expiration of the timer, the computing system determines that the driver has assumed control of the AV, the computing system can deactivate the autonomous mode at 412. If, upon expiration of the timer, the computing system determines that the driver has not assumed control of the AV, the computing system can cause the AV to take a minimal risk maneuver to mitigate any potential danger at 414. The computing system can then deactivate the autonomous mode for the AV at 412.

If the computing system determines that there is a fault occurring in the second braking system, the computing system can continue to control the first braking system. Therefore, the computing system can continue to use the first communication protocol to communicate with the first braking system. The process can then move to step 408. At 408, the computing system can transmit control instructions to issue an alert to the driver, if any, to assume manual control of the AV. The computing system can, based on transmitting instructions to issue the alert, start the timer and then wait for the expiration of a timer to determine whether the driver has assumed control of the AV. If, prior to the expiration of the timer, the computing system determines that the driver has assumed control of the AV, the computing system can deactivate the autonomous mode at 412. If, upon expiration of the timer, the computing system determines that the driver has not assumed control of the AV, the computing system can cause the AV to take a minimal risk maneuver to mitigate any potential danger at 414. The computing system can then deactivate the autonomous mode for the AV at 412.

If the computing system determines that there is a fault occurring in both the first braking system and the second braking system, the computing system can failover to an endurance braking system of the AV. The computing system can further transmit an alert to the driver to use manual control of the AV at 408. The computing system can further cause the AV to perform a minimum risk maneuver at 414. As the computing system has detected a fault occurring in both the first braking system and the second braking system, the computing system can deactivate the autonomous mode regardless of whether there is a detection that the driver has assumed manual control of the AV.

Figure 5:
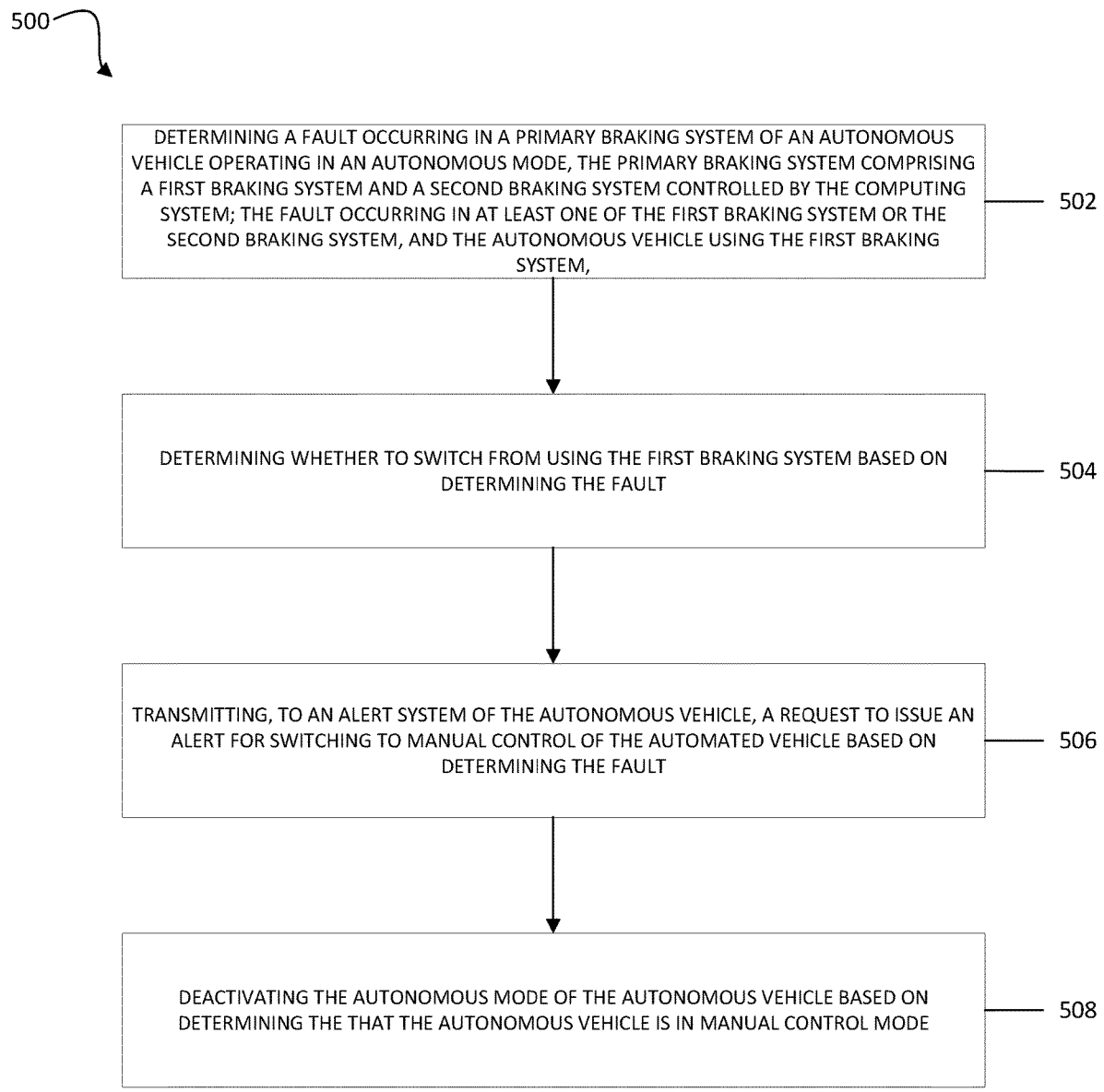
FIG. 5 is a process flow for a fault management system, according to one or more embodiments.

FIG. 5 is a process flow 500 for a fault management system, according to one or more embodiments. At 502, the process can include a computing system determining a fault occurring in a primary braking system of an autonomous vehicle operating in an autonomous mode. The computing system can be an AV ECU of the AV. The fault can be determined based on various factors. The AV can include a set of sensors for monitoring the first braking system and a set of sensors for monitoring the second braking system. The sensors can provide the computing system with data collected from the first braking system and the data collected from the second braking system regardless of whether AV is using the first braking system or the second braking system. Based on the sensor data, or a lack or lapse of sensor data, the computing system can determine whether there is a fault occurring in at least one of the first braking system or the second braking system. The computing system can further be in communication with the first braking system and the second braking system regardless of whether the AV is using the first braking system or the second braking system. Based on the communication, or a lack or lapse thereof, the computing system can determine whether there is a fault occurring in at least one of the first braking system or the second braking system.

The primary braking system can comprise a first braking system and a second braking system controlled by the computing system. The primary (foundation) braking system can include a dual-actuator enabled foundation brake pressure hoses connected to the two actuators that are routed independently from the pressure reservoir to foundation brake discs coupled to the road wheels of the AV. The fault can occur in at least one of the first braking system and the second braking system, and the autonomous vehicle using the first braking system.

At 504, the process can include the computing system determining whether to switch from using the first braking system based on the determining the fault. If the computing system determines that the fault is at the first braking system, the computing system can determine to switch from using the first braking system. For example, if the computing system determines that the fault is at the second braking system and not fault in the first braking system, the computing system can determine to continue using the first braking system for the AV. In another example, if the computing system determines that the fault is at the first braking system but no fault in the second braking system, the computing system can determine to switch to the second braking system. In yet another example, if, however, the computing system determines that the fault is at the first braking system and that there is a fault in the second braking system, the computing system can determine to switch to an endurance braking system.

At 506, the process can include the computing system transmitting a request to an alert system to generate an alert for manual control mode of the AV based on determining the fault. The alert can be a visual alert display on a computing device (e.g., a dashboard display of the AV or display of a user device) or an audio alert (e.g., an audio signal transmitting through an entertainment system of the AV or through a speaker of the user device).

At 508, the process can include deactivating the autonomous mode of the AV upon determining that the AV is in manual control mode. The computing system can start a timer and wait for the expiration of the time for a signal that a driver has assumed control of the AV and the AV is in a manual control mode. In the instance that the computing system determines that the driver has assumed control of the AV prior to the expiration of the timer, the AVECU can deactivate the autonomous mode. In the AV ECU does not determine that the driver has assumed control of the AV upon expiration of the timer, the computing system can cause the AV to make a minimal risk maneuver (e.g., stop moving, pull over to the side of the road). Upon execution of the minimal risk maneuver, the computing system can deactivate the autonomous mode.

Figure 6:
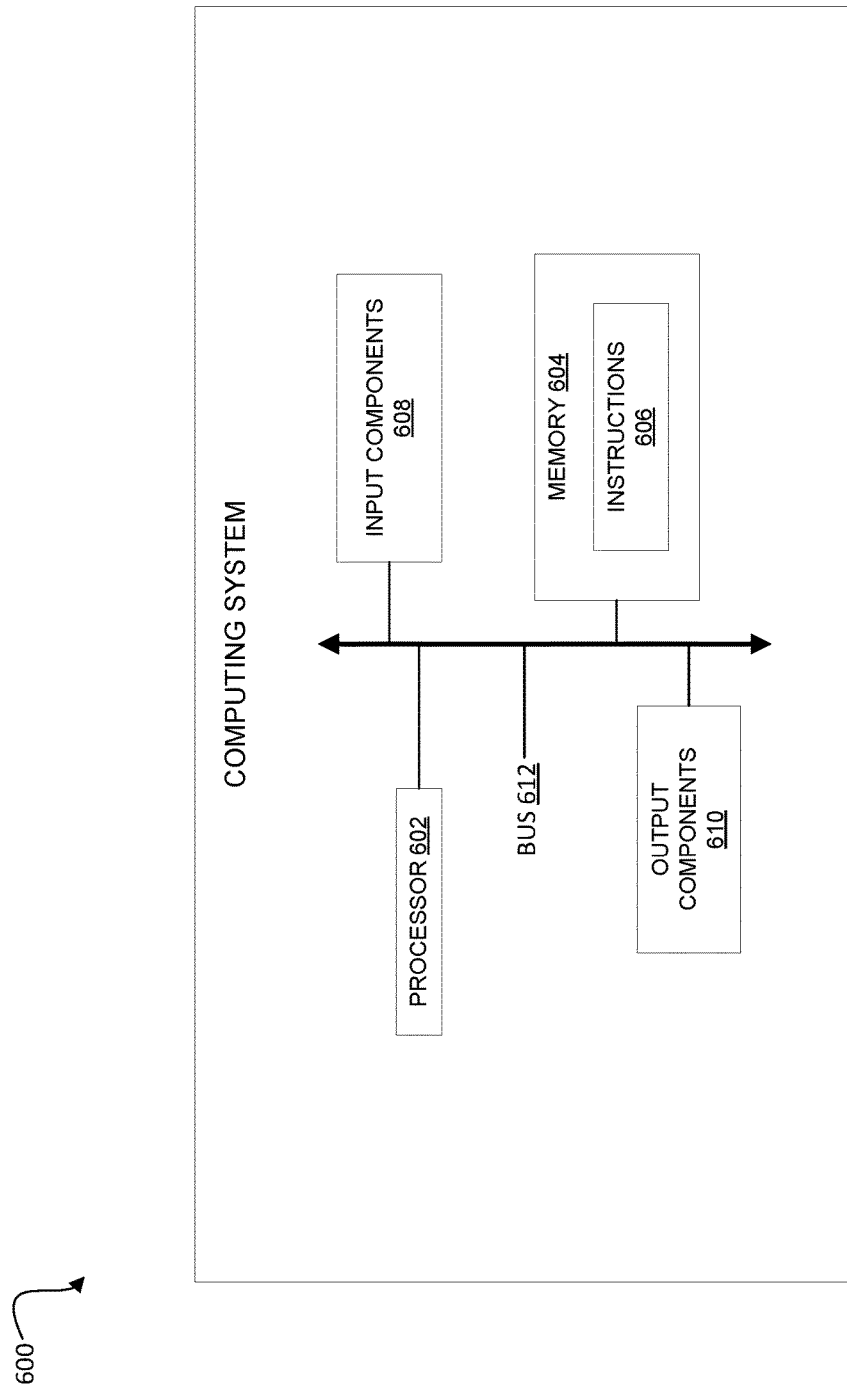
FIG. 6 is a block diagram of an example of a computing system, according to one or more embodiments.

FIG. 6 is a block diagram of an example of a computing system 600 usable for implementing some aspects of the present disclosure. The computing system 600 includes a processor 602 coupled to a memory 604 via a bus 612. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 606 stored in the memory 604 to perform operations. In some examples, the instructions 606 can include processor-specific instructions generated by a compiler or an interpreter from code written in any suitable computer-programming language, such as C, C++, C#, Python, or Java.

The memory 604 can include one memory device or multiple memory devices. The memory 604 may be non-volatile and include any type of memory device that retains stored information when powered off. Examples of the memory 604 can include electrically erasable and programmable read-only memory (EEPROM), flash memory, or any other type of non-volatile memory. At least some of the memory 604 includes a non-transitory computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 606.

The computing system 600 may also include other input and output (I/O) components. The input components 608 can include a mouse, a keyboard, a trackball, a touch pad, a touch-screen display, or any combination of these. The output components 610 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein, can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   determining, by a computing system, a fault occurring at a first braking system and at a second braking system of a primary braking system of an autonomous vehicle operating in an autonomous mode, the first braking system and the second braking system controlled by the computing system, the first braking system comprising a first actuator, the second braking system comprising a second actuator, and while the autonomous vehicle is using the first braking system comprising the first actuator;
   determining, by the computing system, whether to switch from using the first braking system comprising the first actuator based at least in part on determining the fault;
   activating, by the computing system, a back-up braking system that is coupled to a different braking mechanism than that of the first braking system and the second braking system;
   transmitting, by the computing system and to an alert system of the autonomous vehicle, a request to generate an alert for switching to a manual control mode of the autonomous vehicle based at least in part on determining the fault; and
   deactivating, by the computing system, the autonomous mode of the autonomous vehicle upon determining that the autonomous vehicle is in the manual control mode.

2. The method of claim 1, wherein the first braking system is in fluidic communication with a first brake piston and the second braking system is in fluidic communication with a second brake piston, wherein the first braking system is activated via the first actuator, and the second braking system is activated via the second actuator, the second actuator distinct from the first actuator.

3. The method of claim 1, wherein the primary braking system is a dual-actuator enabled system configured to be activated via the first actuator or the second actuator.

4. A system, comprising:
   a processor; and
   a computer-readable medium including instructions that, when executed by the processor, cause the processor to perform operations comprising:
      determining a fault occurring at a first braking system and at a second braking system of a primary braking system of an autonomous vehicle operating in an autonomous mode, the first braking system and the second braking system controlled by the system, the first braking system comprising a first actuator, the second braking system comprising a second actuator, and while the autonomous vehicle is using the first braking system comprising the first actuator;
      determining whether to switch from using the first braking system comprising the first actuator based at least in part on determining the fault;
      activating a back-up braking system that is coupled to a different braking mechanism than that of the first braking system and the second braking system;
      transmitting, to an alert system of the autonomous vehicle, a request to generate an alert for switching to a manual control mode of the autonomous vehicle based at least in part on determining the fault; and
      deactivating the autonomous mode of the autonomous vehicle upon determining that the autonomous vehicle is in the manual control mode.

5. The system of claim 4, wherein the first braking system is in fluidic communication with a first brake piston and the second braking system is in fluidic communication with a second brake piston, wherein the first braking system is activated via the first actuator, and the second braking system is activated via the second actuator distinct from the first actuator.

6. The system of claim 4, wherein the primary braking system is a dual-actuator enabled system configured to be activated via the first actuator or the second actuator.

7. A non-transitory computer-readable medium having stored thereon a sequence of instructions that, when executed by a processor, causes the processor to perform operations comprising:
   determining a fault occurring at a first braking system and at a second braking system of a primary braking system of an autonomous vehicle operating in an autonomous mode, the first braking system and the second braking system controlled by a computing system, the first braking system comprising a first actuator, the second braking system comprising a second actuator, and while the autonomous vehicle is using the first braking system comprising the first actuator;
   determining whether to switch from using the first braking system based at least in part on determining the fault;
   activating a back-up braking system that is coupled to a different braking mechanism than that of the first braking system and the second braking system;
   transmitting, to an alert system of the autonomous vehicle, a request to generate an alert for switching to a manual control mode of the autonomous vehicle based at least in part on determining the fault; and deactivating the autonomous mode of the autonomous vehicle upon determining that the autonomous vehicle is in the manual control mode.

\* \* \* \* \*